(12) United States Patent
Robertson et al.

(10) Patent No.: US 9,672,095 B2
(45) Date of Patent: Jun. 6, 2017

(54) SAFETY LEVEL SPECIFIC ERROR RESPONSE SCHEME FOR MIXED CRITICALITY SYSTEMS

(71) Applicant: Freescale Semiconductor Inc., Austin, TX (US)

(72) Inventors: Alistair Paul Robertson, Glasgow (GB); Andrew Edward Birnie, Bearsden (GB); Alison Young, Clarkston (GB)

(73) Assignee: NXP USA, Inc., Austin, TX (US)

( * ) Notice: Subject to any disclaimer, the term of this patent is extended or adjusted under 35 U.S.C. 154(b) by 25 days.

(21) Appl. No.: 14/859,457

(22) Filed: Sep. 21, 2015

(65) Prior Publication Data
US 2017/0083391 A1    Mar. 23, 2017

(51) Int. Cl.
*G06F 11/00*    (2006.01)
*G06F 11/07*    (2006.01)

(52) U.S. Cl.
CPC ........ *G06F 11/079* (2013.01); *G06F 11/0739* (2013.01); *G06F 11/0751* (2013.01)

(58) Field of Classification Search
USPC ........................................................ 714/38.1
See application file for complete search history.

(56) References Cited

U.S. PATENT DOCUMENTS

| | | | |
|---|---|---|---|
| 2004/0169591 A1* | 9/2004 | Erkkinen | G06Q 10/00 340/945 |
| 2011/0029191 A1 | 2/2011 | Macri et al. | |
| 2012/0239256 A1* | 9/2012 | Hammerschmidt | H04L 1/0061 701/45 |
| 2013/0246866 A1* | 9/2013 | Costin | B60W 50/04 714/55 |
| 2013/0268798 A1 | 10/2013 | Schade et al. | |

* cited by examiner

Primary Examiner — Sarai Butler

(57) ABSTRACT

An error response method for a mixed criticality system includes assigning a safety level to an application executed by a processor. Executing the application includes a transaction between the processor and a resource. The safety level is stored at the resource. The safety level and a fault indication are transmitted from the resource to a fault collection and control unit (FCCU). The fault indication is responsive to a fault from the resource. The FCCU responds to the fault indication with an action determined by the safety level.

20 Claims, 4 Drawing Sheets

SAFETY LEVEL SPECIFIC ERROR RESPONSE SCHEME FOR MIXED CRITICALITY SYSTEMS

FIELD

The disclosure relates generally to the management of faults in processor transactions, and more specifically to handling faults with different levels of criticality in a processing system with shared resources.

BACKGROUND

Systems that host applications with different safety level requirements, (e.g. mixed criticality systems), are becoming more prevalent in automotive vehicle networks. For example, a single processor may host an application that affects steering, with a less safety critical application that affects fuel economy. Increasing levels of system integration have resulted in multi-core devices and powerful domain controllers that increase the likelihood of mixing different safety levels within a single Electronic Control Unit (ECU).

ISO 26262 is a risk based standard regarding the functional safety of electrical and electronic systems within road vehicles. ISO26262 defines four Automotive Safety Integrity Levels (ASIL), namely ASIL A, ASIL B, ASIL C, ASIL D in order of integrity, with ASIL A being the lowest integrity level, and ASIL D being the highest integrity level. Hazards that are identified as simply Quality Management (QM) do not dictate any safety requirements.

With automotive vehicle networks running applications having different ASIL classifications, there is a need to separately manage the respective faults of each application to ensure adequate system availability without unduly compromising fault management. For example, a system hosting an ASIL B application on a higher integrity ASIL D platform may generate a higher number of faults than on a native ASIL B platform. This can lead to excessive warranty and service costs for faults that do not otherwise dictate such costly measures.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the management of faults associated with applications having different safety levels and sharing a resource. Each application is assigned a safety level (e.g. a QM or ASIL level), which may differ from the safety level of another application sharing the same resource. The safety level need not be constrained by those defined in ISO 26262, or even limited by the automotive market, as the teachings of this disclosure apply to other electronic systems, for example a fly-by-wire system. The safety level of each application is communicated to the shared resource upon transacting with that resource. Subsequent transactions to the shared resource can overwrite or update the safety level at the shared resource. When a fault is detected by the resource as a result of transacting with the resource, or from a subsequent operation of the resource, a fault indication and the associated safety level are sent to an FCCU (or similar error handler), wherein the FCCU responds to the fault indication in a manner appropriate to the associated safety level.

Accordingly, a safety level specific error response is provided to a fault from an application without imposing excessive, (or inadequate) fault handling on other applications sharing the same resource. It should be understood that a safety level can also be assigned to one of several threads being executed within an application, that the application can be executed across multiple processors, and multiple instances of the same application can have different safety levels depending on the context within which each application is run.

Figure 1:
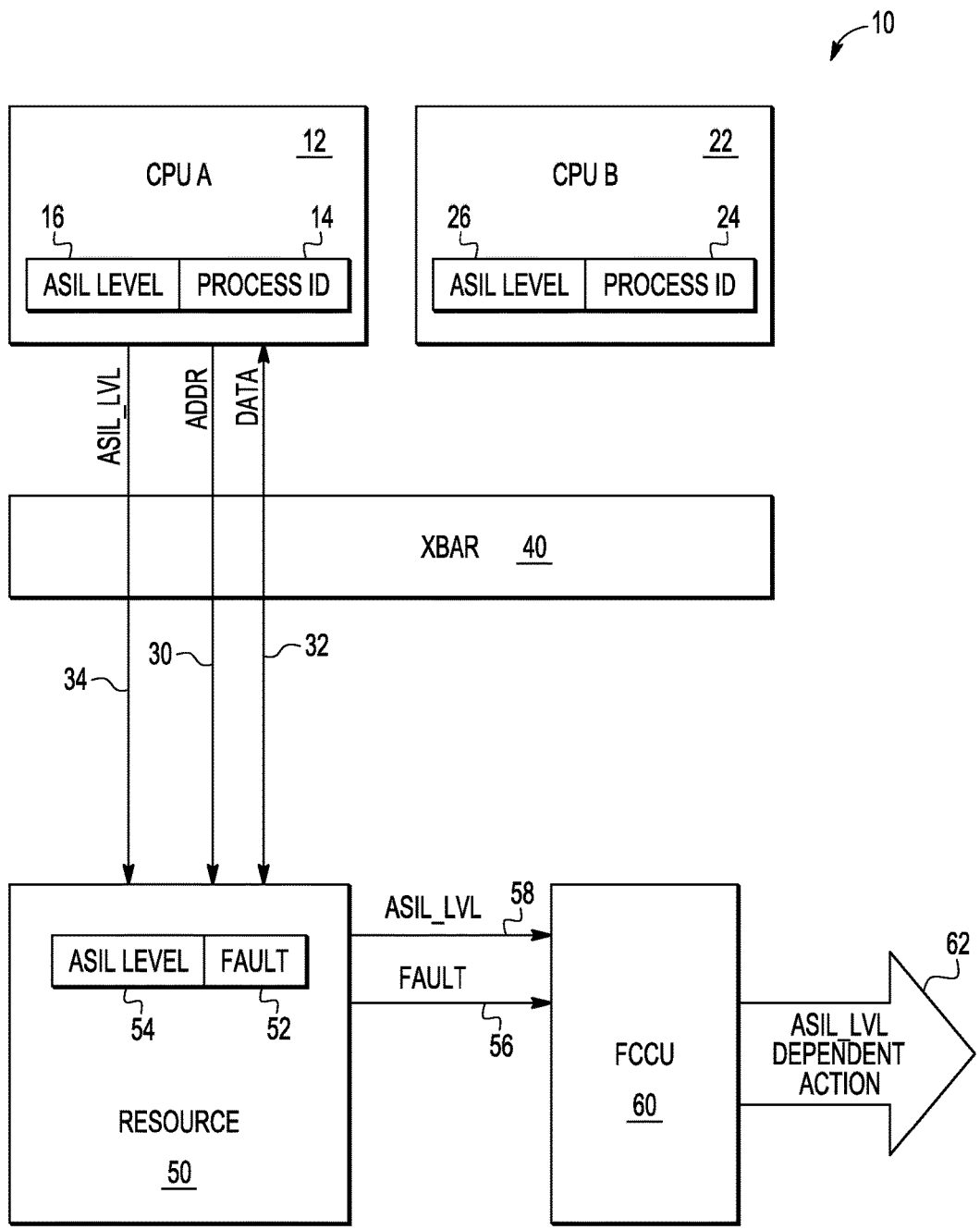
FIG. 1 is a schematic view of a mixed criticality system in accordance with an embodiment of the present disclosure.

With reference to FIG. 1, a mixed-criticality system 10 is shown with a Central Processing Unit (CPU) A 12 having a process ID 14 and an ASIL level 16. The system 10 also includes a second CPU B 22, having a process ID 24 and an ASIL level 26. In another embodiment, additional CPUs are included in the system 10. Other embodiments, replace the CPU with a processor, a core, a microprocessor, an ECU or a Microcontroller Unit (MCU). In one embodiment, each CPU has signal lines for at least an address ADDR 30, a data DATA 32, and a safety level sideband ASIL_LVL 34, shared with a crossbar XBAR 40 to a resource 50. For clarity, signals ADDR 30, DATA 32 and ASIL_LVL 34 are only shown between CPU A 12 the resource 50, although similar connections exist between CPU B 22 and the shared resource 50, multiplexed with the XBAR 40. In another embodiment, the ASIL_LVL 34 signal is time interleaved with either the ADDR 30 signal or the DATA 32 signal, rather than being a separate conductor from ADDR 30 or DATA 32.

An application running on either CPU A 12 or CPU B 22 may be as benign as controlling cabin temperature in an automobile, or as critical as controlling steering in a steer-by-wire system, with an appropriate ASIL level assigned to ASIL level 16 or ASIL Level 26 respectively. In one embodiment, an application can include several execution threads, each having a corresponding ASIL level. Each execution thread can be run on a separate CPU, or on a single CPU. In another embodiment, more than one application is run on a single CPU with each application having a corresponding ASIL level. Each application or thread will have a corresponding Process ID, Task ID or the like. In another embodiment, the initiation or termination of an application is determined by code running from an address range, where the address range also determines the safety level (e.g. code running from address range A has a safety level of ASIL A, and code running from address range B has a safety level of ASIL B).

In one example, the safety level (e.g. an ASIL level) is assigned to an application based on the context within which the application is run. The safety level can be predetermined, or it can be assigned at a higher level in the system, by another application or device. An application executed on CPU A 12 will have a Process ID 14 and an ASIL Level 16. The application will transact with the resource 50 with the ADDR 30 and DATA 32, which form at least part of a system bus. When the application first transacts with the resource 50, the ASIL Level 16 is transmitted to the resource 50 and stored (e.g. latched) at 54.

A fault indication 52 is stored when a fault occurs at the resource 50. A fault can occur either from the initial transaction between the CPU A 12 and the resource 50, or a subsequent operation of the resource 50 initiated by the transaction. In one example, the resource 50 is a memory (e.g. an SRAM). The processor attempts to read the memory, and a failure is detected by a comparison of a parity bit, check-sum or Error Detection and Correction (EDC) circuit. In another example, the resource 50 is a timer. The timer is started by a transaction from the CPU A 12, only to fail (and generate a fault) at a later time, when the CPU A 12 has begun execution of a new application (with a new ASIL Level 16), not yet requiring a transaction with the resource 50. In each of the two examples where the resource 50 is either a memory or a timer, the fault indication 52 is set to true.

Upon detection of a fault in the resource 50 by the status of the fault indication 52, the fault indication 52 is transmitted to a Fault Collection and Control Unit (FCCU) 60 as FAULT 56, and the safety level corresponding to the application that was last stored in the resource 50 is transmitted to the FCCU 60 as ASIL_LVL 58. In one embodiment, the transmission of the fault indication 52 includes other pertinent information regarding the fault including, but not limited to, the type of fault, the time that the fault occurred, and various other parameters necessary to characterize or reproduce the fault conditions.

When the resource 50 has stored an ASIL Level at 54 and begun to perform an operation initiated by the application running on either CPU A 12 or CPU B 22, a new application can then be run on either CPU A 12 or CPU B 22. If the new application then transacts with the shared resource 50, a new ASIL Level is stored at 54 (overwriting the previously stored ASIL Level), wherein the new ASIL Level corresponds to the new application.

Once the FCCU 60 receives a FAULT 56 and an ASIL_LVL 58 from the resource 50, the FCCU 60 responds to the fault indication with a safety level dependent action 62 that is appropriate to the ASIL_LVL 58 signal for the type of fault indicated by FAULT 56. Examples of safety level dependent actions are shown in Table 1.

With reference to FIG. 1 and Table 1, if the fault source stems from a failed Error Correction Code (ECC) where the resource 50 is an SRAM, and the application was run with the T0 thread on CPU A 12, one of five ASIL_LVL dependent actions 62 occur. For example, for safety levels QM, ASIL A or ASIL B, the fault is corrected but not logged (e.g. ignored). For the more critical safety levels ASIL C and ASIL D, the fault is both logged and corrected. The example actions shown in Table 1 are not exhaustive. In another example, the ECC is insufficient to correct the error (e.g. due to an excessive number of failed bits), in which case the action to "correct" is an attempted action to correct the error. In another example, the action for an SRAM with ECC with a QM safety level includes correcting, but not ignoring (e.g. not logging), the error. If the fault source is from a Built In Self Test (BIST), and the application was run with the T1 thread on CPU B 22, the fault is ignored if the safety level is QM. If the safety level is ASIL A or ASIL B, the fault is logged. If the safety level is ASIL C, the resource 50 is functionally reset. If the safety level is ASIL D, the resource 50 is reset with a Power On Reset (POR). In one example, a power reset is required, when the state of a state machine prevents the execution of a functional reset. If the fault source is a lockstep failure, and the application was run with the T1 thread on CPU A 12, the fault is logged for safety levels QM, ASIL A and ASIL B. If the safety level is ASIL C or ASIL D, the resource is functionally reset. One example of a lockstep is to duplicate the resource 50 and compare the results of the resource 50 with the duplicate resource.

Figure 2:
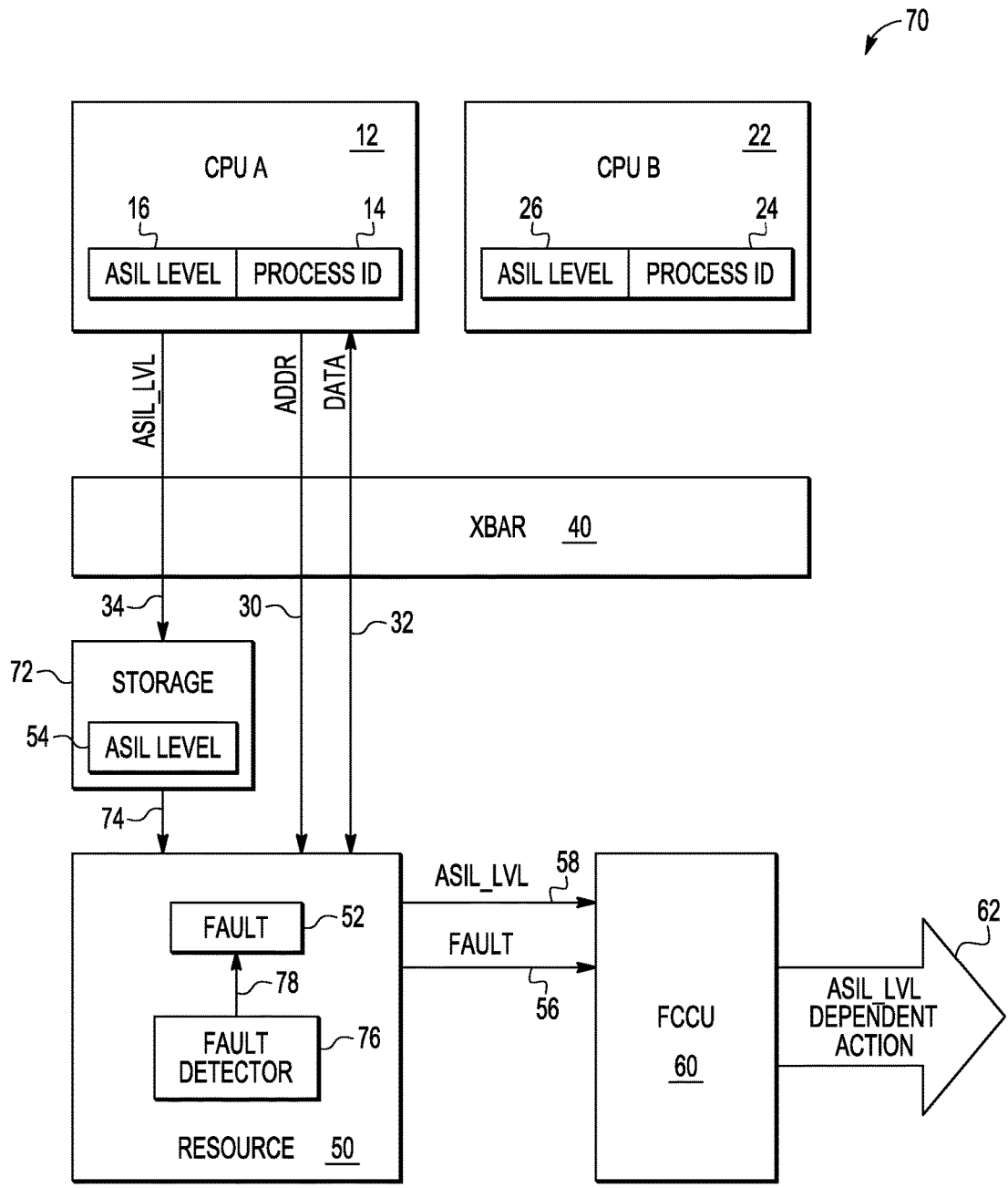
FIG. 2 is a schematic view of the embodiment of FIG. 1 with separate storage for a safety level.

The embodiment 70 of FIG. 2 is a modification to the embodiment 10 of FIG. 1, wherein the ASIL Level 54 is stored separately from the resource 50 in a storage 72. The storage 72 is closely coupled to the resource 50 with a path 74, such that the path 74 does not significantly contribute to generating faults within the resource 50. In one example, the storage is part of an SRAM controller coupled to an SRAM. In another example, the storage 72 is a register of a state machine (a timer or communication port for example). In one embodiment, the resource 50 includes a fault detector 76, coupled to the fault indication 52 with a path 78. In one example, the fault detector 76 is a BIST, a check-sum, an ECC or a majority vote circuit. The embodiment 70 of FIG. 2 provides an advantage over the embodiment 10 of FIG. 1 in one example where the resource 50 lacks storage for the ASIL Level.

Figure 3:
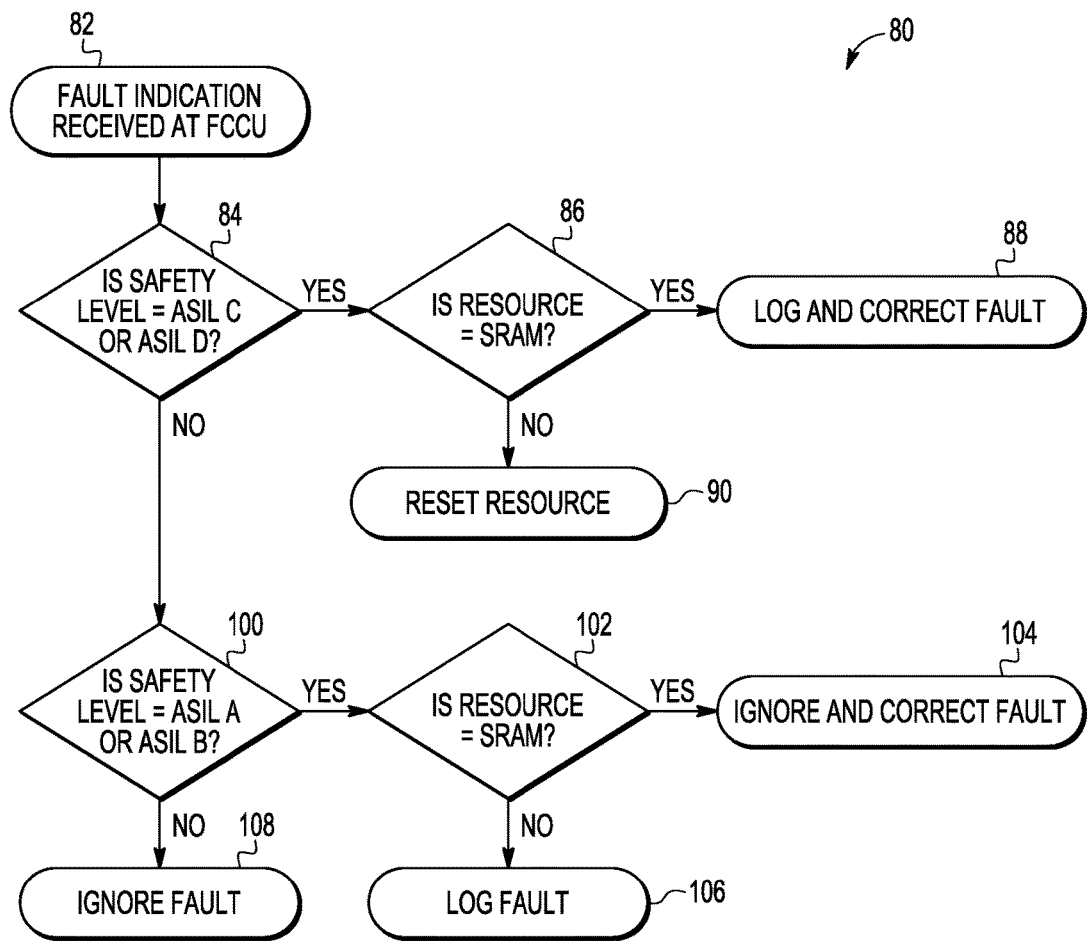
FIG. 3 is a decision tree for a Fault Collection and Control Unit (FCCU).

In one embodiment, the FCCU uses a lookup table as shown in Table 1. FIG. 3 shows another embodiment of the FCCU 60 using a decision tree 80 to determine the ASIL_LVL dependent action 62 based on the safety level and the type of resource. A fault indication is received at the FCCU 60 at 82. If the safety level is determined to be ASIL C or ASIL D at 84, then resource 50 is evaluated at 86 to determine if the resource 50 is an SRAM. If the resource 50 is an SRAM, then the fault is logged and corrected at 88. If the resource 50 is not an SRAM, then the resource 50 is reset at 90. If the safety level is determined not to be ASIL C or ASIL D at 84, then the safety level is evaluated at 100 to determine if the safety level is ASIL A or ASIL B. If the safety level is ASIL A or ASIL B, then the resource 50 is evaluated at 102 to determine if the resource 50 is an SRAM. If the resource 50 is an SRAM, then the fault is ignored (e.g.

TABLE 1

FCCU look-up table

| Fault Source | CPU/Thread | QM | ASIL A | ASIL B | ASIL C | ASIL D |
|---|---|---|---|---|---|---|
| SRAM + ECC | A/T0 | Ignore & Correct | Ignore & Correct | Ignore & Correct | Log & Correct | Log & Correct |
| BIST | B/T1 | Ignore | Log | Log | Functional Reset | Power On Reset |
| Lockstep | A/T1 | Log | Log | Log | Functional Reset | Functional Reset | not logged) and corrected at 104, otherwise the fault is logged at 106. If the safety level is neither ASIL A nor ASIL B, the fault is ignored at 108. Other variations of the decision tree 80 are envisioned within the scope and spirit of this disclosure including, for example, evaluating whether the resource 50 is an SRAM before evaluating the type of safety level.

Figure 4:
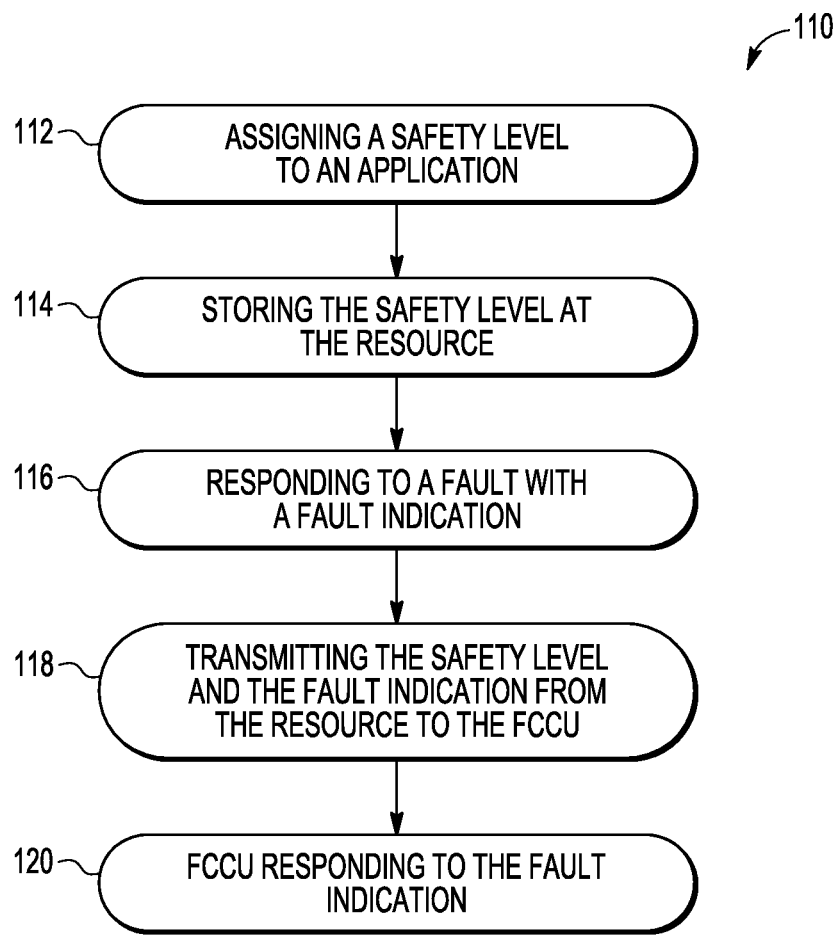
FIG. 4 is a flowchart representation of a method for responding to a mixed criticality system in accordance with an embodiment of the present disclosure.

FIG. 4 is flowchart representation of a method 110 for responding to a mixed criticality system. A safety level is assigned to an application at 112. The safety level is stored at the resource 50 at 114. A fault is responded to with a fault indication 52 at 116. The safety level at 54 and the fault indication 52 are transmitted from the resource 50 to the FCCU 60 at 118. The FCCU 60 responds 62 to the fault indication 52 at 120.

As will be appreciated, embodiments as disclosed include at least the following. In one embodiment, an error response method for a mixed criticality system comprises assigning a safety level to an application executed by a processor, wherein executing the application comprises a transaction between the processor and a resource. The safety level is stored at the resource. The safety level and a fault indication are transmitted from the resource to a Fault Collection and Control Unit (FCCU). The fault indication is responsive to a fault from the resource. The FCCU responds to the fault indication with an action determined in part by the safety level.

Alternative embodiments of the error response method for a mixed criticality system include one of the following features, or any combination thereof. A second safety level is assigned to a second application executed by a second processor, wherein the second application comprises a second transaction between the second processor and the resource, and the second transaction terminates after the transaction, the safety level of the application is replaced with the second safety level of the second application at the resource, and the FCCU responds to the fault indication associated with the second transaction with a second action determined by the second safety level. A second safety level is assigned to a second application executed by the processor, wherein the second application comprises a second transaction between the processor and the resource, and the second transaction terminates after the transaction, the safety level of the application is replaced with the second safety level of the second application at the resource, and the FCCU responds to the fault indication associated with the second transaction with a second action determined by the second safety level. Assigning the safety level to the application further comprises assigning a safety level to each of a plurality of application channels, each application channel transacting with a corresponding channel of the resource. The safety level is an Automotive Safety Integrity Level. The safety level is specific to the application. The fault from the resource is a failure of the transaction between the processor and the resource. The fault from the resource is a failure from a subsequent operation of the resource. The resource is a memory and the action includes at least one of ignoring the fault, correcting the fault, and logging the fault. The resource is one of a state machine, a peripheral and an input/output device and the action includes a predetermined task.

In another embodiment, a mixed criticality system comprises a processor configured to execute an application having an associated safety level. A resource is coupled to the processor by a system bus. A storage device is associated with the resource and configured to store the safety level received from the processor. A Fault Collection and Control Unit (FCCU) is coupled to the resource. The FCCU is configured to perform an action determined in part by the safety level in response to a fault from the resource.

Alternative embodiments of the mixed criticality system include one of the following features, or any combination thereof. The resource is coupled to the processor with a sideband path separate from the system bus. The resource is coupled to the processor with a time-interleaved signal on the system bus. The storage device is a register coupled to the resource. The system is an automotive vehicle network. The fault from the resource is a failure of the transaction between the processor and the resource. The fault from the resource is a failure from a subsequent operation of the resource. The safety level is an Automotive Safety Integrity Level. The safety level is specific to the application.

In another embodiment, an error response method for a mixed criticality system comprises assigning an Automotive Safety Integrity Level (ASIL) to an application executed by a processor, wherein executing the application comprises a transaction between the processor and a resource. The ASIL and a fault indication are transmitted from the resource to a Fault Collection and Control Unit (FCCU) for the application, wherein the fault indication is responsive to a fault from the resource. The FCCU responds to the fault indication with an action determined in part by the safety level.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An error response method for a mixed criticality system comprising:
   assigning a safety level to an application executed by a processor, wherein executing the application comprises a transaction between the processor and a resource;
   storing the safety level at the resource;
   transmitting the safety level and a fault indication from the resource to a Fault Collection and Control Unit (FCCU), the fault indication responsive to a fault from the resource; and
   responding by the FCCU to the fault indication with an action determined in part by the safety level.

2. The method of claim 1 further comprising:
   assigning a second safety level to a second application executed by a second processor, wherein
      the second application comprises a second transaction between the second processor and the resource, and
      the second transaction terminates after the transaction;
   replacing the safety level of the application with the second safety level of the second application at the resource; and
   responding, by the FCCU, to a fault indication associated with the second transaction with a second action determined by the second safety level.

3. The method of claim 1 further comprising:
assigning a second safety level to a second application executed by the processor, wherein
the second application comprises a second transaction between the processor and the resource, and
the second transaction terminates after the transaction;
replacing the safety level of the application with the second safety level of the second application at the resource; and
responding, by the FCCU, to the fault indication associated with the second transaction with a second action determined by the second safety level.

4. The method of claim 1 wherein assigning the safety level to the application further comprises assigning a safety level to each of a plurality of application channels, each application channel transacting with a corresponding channel of the resource.

5. The method of claim 1 wherein the safety level is an Automotive Safety Integrity Level.

6. The method of claim 1 wherein the safety level is specific to the application.

7. The method of claim 1 wherein the fault from the resource is a failure of the transaction between the processor and the resource.

8. The method of claim 1 wherein the fault from the resource is a failure from a subsequent operation of the resource.

9. The method of claim 1 wherein the resource is a memory and the action includes at least one of ignoring the fault, correcting the fault, and logging the fault.

10. The method of claim 1 wherein the resource is one of a state machine, a peripheral and an input/output device and the action includes a predetermined task.

11. A mixed criticality system comprising:
a processor configured to execute an application having an associated safety level;
a resource coupled to the processor by a system bus;
a storage device associated with the resource and configured to store the safety level received from the processor; and
a Fault Collection and Control Unit (FCCU) coupled to the resource, wherein the FCCU is configured to perform an action determined in part by the safety level in response to a fault from the resource.

12. The system of claim 11 wherein the resource is coupled to the processor with a sideband path separate from the system bus.

13. The system of claim 11 wherein the resource is coupled to the processor with a time interleaved signal on the system bus.

14. The system of claim 11 wherein the storage device is a register coupled to the resource.

15. The system of claim 11 wherein the system is an automotive vehicle network.

16. The system of claim 11 wherein the fault from the resource is a failure of the transaction between the processor and the resource.

17. The system of claim 11 wherein the fault from the resource is a failure from a subsequent operation of the resource.

18. The system of claim 11 wherein the safety level is an Automotive Safety Integrity Level.

19. The system of claim 11 wherein the safety level is specific to the application.

20. An error response method for a mixed criticality system comprising:
assigning an Automotive Safety Integrity Level (ASIL) to an application executed by a processor, wherein executing the application comprises a transaction between the processor and a resource;
transmitting the ASIL and a fault indication, from the resource to a Fault Collection and Control Unit (FCCU) for the application, wherein the fault indication is responsive to a fault from the resource; and
responding by the FCCU to the fault indication with an action determined in part by the safety level.

* * * * *